United States Patent
Rowe

(10) Patent No.: US 7,065,973 B2
(45) Date of Patent: Jun. 27, 2006

(54) STALL DETECTION AND RECOVERY SYSTEM

(75) Inventor: Arthur L Rowe, Derby (GB)

(73) Assignee: Rolls-Royce PLC, London (GB)

( * ) Notice: Subject to any disclaimer, the term of this patent is extended or adjusted under 35 U.S.C. 154(b) by 289 days.

(21) Appl. No.: 10/766,009

(22) Filed: Jan. 29, 2004

(65) Prior Publication Data
US 2006/0112697 A1  Jun. 1, 2006

(30) Foreign Application Priority Data
Feb. 26, 2003  (GB) ................. 0304325.4

(51) Int. Cl.
*F02C 9/00*  (2006.01)

(52) U.S. Cl. .................... 60/779; 60/39.281
(58) Field of Classification Search ......... 60/39.27, 60/39.281, 772, 773, 779
See application file for complete search history.

(56) References Cited

U.S. PATENT DOCUMENTS

| | | | |
|---|---|---|---|
| 3,267,669 A | | 8/1966 | Tissier |
| 4,060,980 A | * | 12/1977 | Elsaesser et al. ............. 60/773 |
| 4,117,668 A | | 10/1978 | Elsaesser et al. |
| 4,118,926 A | * | 10/1978 | Curvino et al. ............. 607/778 |
| 4,622,808 A | * | 11/1986 | Kenison et al. ............... 60/795 |
| 4,768,338 A | * | 9/1988 | Lindler et al. ............. 60/39.27 |
| 2001/0045088 A1 | | 11/2001 | Sugitani |

* cited by examiner

*Primary Examiner*—Louis J. Casaregola
(74) *Attorney, Agent, or Firm*—Oliff & Berridge, PLC

(57) ABSTRACT

A stall detection and recovery system (10) for a gas turbine engine (1) comprises surge detection means (50 for detecting an engine surge and providing a surge detection signal (154) for indicating said engine surge. The system also includes stall detection means to provide a stall detection signal (48) relating to a condition of gas flowing through the engine (1). The system (10) also includes stall recovery means (58) to receive the surge detection signal (154) and the stall detection signal. The stall recovery means (58) is arranged to control combustor operating means, whereby when the stall detection signal (48) indicates an engine stall, the stall recovery means controls the combustor operating means to effect recover from the stall.

29 Claims, 2 Drawing Sheets

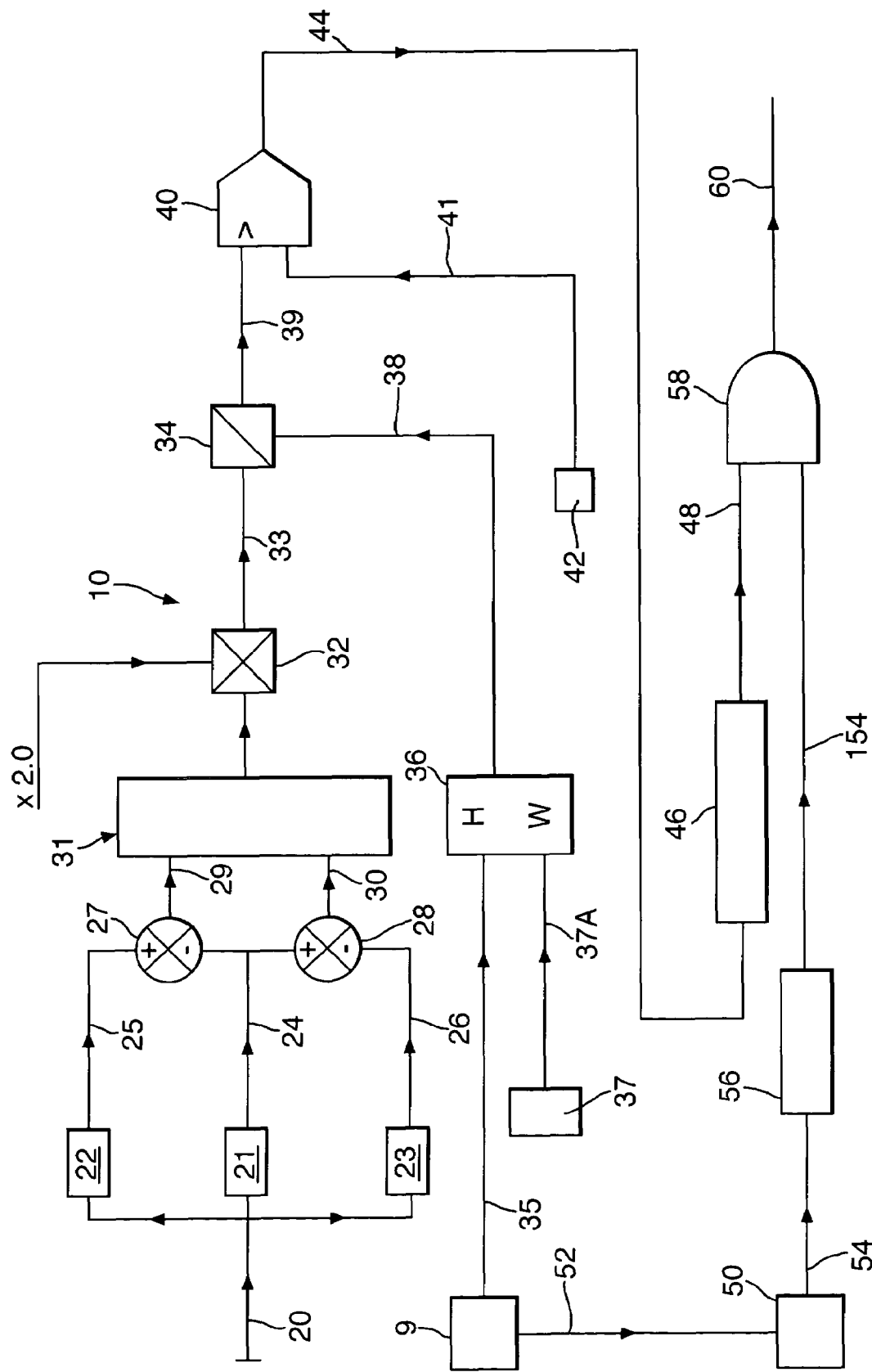

STALL DETECTION AND RECOVERY SYSTEM

This invention relates to stall detection and recovery systems for gas turbine engines. The invention also relates to stall detection means.

In gas turbine engines used on aircraft, there is a risk of externally induced surge and stall events, for example due to aircraft manoeuvres. These events can be particularly serious on single engine installations, if they occur during critical flight phases, for example near the ground.

There are three possible outcomes from a gas turbine engine surge:—
 (1) natural recovery
 (2) stall
 (3) immediate flameout.

Stall is a quasi-steady state that can develop in an engine following a surge. It is characterised by low efficiency and flow capacity and can result in engine overheat and large scale thrust loss.

In many gas turbine engines, there is a power level above which natural recovery is the normal outcome and below which stall is the normal outcome. Immediate flameout usually only occurs at low pressures and/or weak initial fuel mixtures.

Control actions in order to recover from a stall are normally initiated upon the detection of the initial surge event. There is, thus, the possibility that unnecessary control action could be taken in the case of a naturally recoverable surge. It is undesirable to trigger the control action to recover from a stall in the case of a naturally recoverable surge.

According to one aspect of this invention there is provided a stall detection and recovery system for a gas turbine engine, the system comprising surge detection means for detecting an engine surge and providing a surge detection signal indicating said engine surge, stall detection means to provide a stall detection signal relating to a condition of gas flowing through the engine, and stall recovery means to receive said surge detection signal and said stall detection signal, said stall recovery means being arranged to control combustor operating means, whereby when the stall detection signal indicates an engine stall, the stall recovery means controls the combustor operating means to effect recovery from the stall.

Preferably, the combustor operating means comprises means to supply fuel to the combustor, and may also comprise an ignitor for igniting the fuel.

Preferably, the control means operates to interrupt momentarily said supply of fuel and to ignite the fuel supplied to the engine after said momentary interruption.

Preferably, the condition of the gas to which the second signal relates is pressure of the gas.

Preferably, the system includes delay means to impart a delay of a predetermined time to the surge detection signal. Desirably, the stall recovery means operates to effect recovery from the stall said predetermined time after the surge detection signal indicates an engine surge providing the stall detection signal still indicates an engine stall. The predetermined time may be 0 to 10 seconds, preferably 0.1 to 10 seconds, more preferably 0.1 to 1 second and, most preferably, substantially 0.5 seconds.

The stall detection means may comprise a pressure monitoring arrangement for monitoring the pressure at a region of the engine and providing a pressure signal. Preferably, the stall detection means comprises processing means to process the pressure signal. The pressure monitoring arrangement may comprise a first pressure measuring means for measuring the pressure at a first region of the engine and providing a measured first signal, being said pressure signal. The pressure monitoring arrangement may comprise a second pressure measuring means for measuring the pressure at a second region of the engine and providing a measured second pressure signal. Preferably, the second region of the engine is the combustor, and the second pressure signal desirably relates to the pressure in the combustor.

The processing means may comprise filter means for filtering the first pressure signal. Preferably, the filter means provides a first filtered signal indicative of the time average value of the first pressure signal. The filter means may provide a second filtered signal indicative of high values of the first pressure signal. The second filtered signal may be indicative of maximum peaks of the first pressure signal. The filter means may provide a third filtered signal indicative of low values of the first pressure signal. The third filtered signal may be indicative of minimum peaks of the first pressure signal.

The processing means may further include comparator means for providing a first difference signal, being the difference between the first filtered signal and the second filtered signal. The comparator means may also provide a second difference signal, being the difference between the first filtered signal and the third filtered signal.

The processing means may further include gate means, for transmitting the lowest of the first and second difference signals. The gate means is preferably a low wins gate.

The processing means may further comprise multiplying means for multiplying said transmitted difference signal by a predetermined factor, and provide a multiplied pressure signal. Conveniently, the predetermined factor is 2.

The stall detection means may comprise fixed signal transmission means for transmitting a predetermined second pressure signal. The predetermined second pressure signal is preferably a signal relating to a pressure which is lower than the expected pressure of the second pressure signal during normal running of the engine. Preferably, the predetermined second pressure signal is higher than the pressure in the second region of the engine during engine start or sub-idle operation or when the engine is unlit. For example, the predetermined second pressure signal may relate to a pressure of substantially 10 psia.

The stall detection means may comprise second processing means to process the measured second pressure signal, and the predetermined second pressure signal. The second processing means may comprise further gate means for transmitting the highest of the measured second pressure signal and the predetermined second pressure signal. The further gate means may be a high wins gate.

Preferably, stall detection means comprises divider means to divide the multiplied pressure signal by the transmitted second pressure signal to provide a divided signal.

The stall detection means may further comprise a comparator device to compare the divided signal by a threshold signal, whereby in the event of the divided signal being greater than the threshold signal, a stall is indicated. Preferably, the comparator device provides said stall output signal. The stall detection means may comprise integration means, which may be a fault integrator. The stall output signal may be received by the integration means. Preferably, the integration means can produce said stall detection signal which indicates that a stall has been detected.

The surge detection means may provide a surge signal, indicative of a surge having been detected. Preferably, the surge signal is received by the delay means to imparts said delay to the surge signal.

The surge detection means may comprise combustor monitoring means to monitor a condition of the gas in the combustor. Preferably, the combustor monitoring means monitors combustor pressure.

Preferably, the stall detection signal and the surge detection signal are transmitted through the control means for controlling the supply of fuel and the ignitor as aforesaid.

According to another aspect of this invention, there is provided stall detection means for a gas turbine engine, comprising a monitoring arrangement for monitoring the condition of gas flowing through the engine at a first region of the engine and providing a first pressure signal, and for monitoring the condition of gas flowing through the engine at a second region of the engine and providing a second pressure signal, processing means for processing the first and second pressure signals to provide a processed signal, and means for providing a threshold signal, wherein the processing means further includes comparator means for comparing on the processed pressure signal with the threshold signal and providing an output signal relating to the comparison of the first and second processed signals.

Preferably, the monitoring arrangement comprises a pressure monitoring arrangement to measure the gas pressure at said first and second regions. Desirably the output signal comprises a stall detection signal to indicate the presence or otherwise of the presence of stall.

The stall detection arrangement may comprise the further features of the stall detection means described above.

An embodiment of the invention will now be described by way of example only, with reference to the accompanying drawings, in which:—

FIG. 2 is a schematic diagram showing the stall detection and recovery system.

Figure 1:
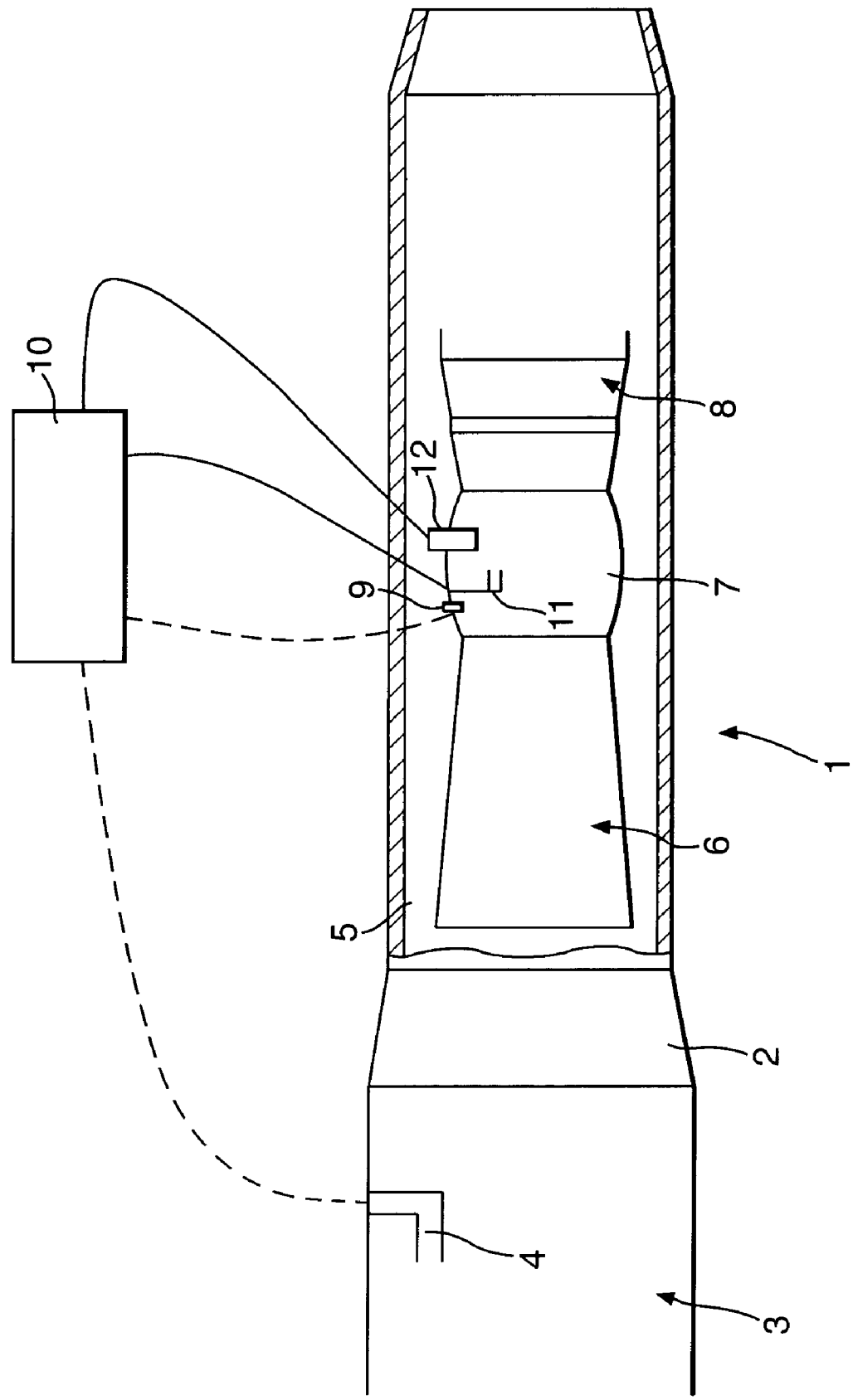
FIG. 1 is a diagrammatic view of a gas turbine engine.

Referring to FIG. 1, there is shown diagrammatically a two shaft gas turbine engine 1 comprising a fan 2, a fan intake duct 3, and an intake pressure probe 4 arranged in the intake duct 3. Downstream of the fan 2, the flow of air is divided to pass through a bypass duct 5 and a high pressure compressor 6.

The flow of air from the high pressure compressor enters a combustor 7 where fuel is burned to drive the high and low pressure turbines 8.

Surge detection means comprising a combustor pressure probe 9 is arranged within the combustor 7 to measure the pressure therein. The combustor pressure probe 9 is connected to a stall detection and recovery system 10.

Fuel supply injectors 11 are provided in the combustor 7 to supply fuel thereto. Also, the combustor 7 comprises igniters 12 for initial ignition of the fuel in the combustor 7. The fuel injectors 11 and the igniters 12 are connected to the stall detection and recovery system.

The stall detection and recovery system 10 is adapted to detect engine surge events by monitoring the combustor pressure via the combustor pressure probe 9. This technique is generally well known in the art and is not described herein. When a surge has been detected, the intake of gas via the intake duct 3 is monitored by the intake pressure probe 4 to detect any fluctuations in pressure, which would indicate that an engine stall has occurred.

A schematic diagram of the stall detection and recovery system 10 is shown in FIG. 2. A first pressure signal 20 is transmitted from the intake pressure probe 4 to processing means which comprises three parallel filter blocks 21, 22, 23. The filter block 21 is a first order filter and produces a first filtered signal 24 indicative of the time average value of the first pressure signal. The filter block 22 allows high input signals through, but applies a first order lag to low signals. The filter block 22 provides a second filtered signal 25 indicative of the maximum peak level of the first pressure signal.

The filter block 23 allows low signals through, but applies a first order lag to high signals. The third filter block 23 provides a third filtered signal 26 indicative of the minimum peak level of the first pressure signal.

The filtered signals are fed to comparator means comprising first and second comparators 27, 28 to provide a first difference signal 29 which is the difference between the first filtered signal 24 and the second filtered signal 25, and to provide a second difference signal 30 which is the difference between the first filtered signal and the second filtered signal 26. The first and second difference signals 29, 30 are received by first gate means comprising a low wins gate 31, which allows the lowest of the first and second difference signals 29, 30 to be transmitted to multiplier means 32 where the signal is multiplied by a predetermined factor, which in the preferred embodiment is 2.0. A multiplied signal 33 is provided from the multiplier means, and received by a divider means 34 in which the signal is divided by a processed second pressure signal 38, as explained below.

The multiplied signal 33 represents an approximation of the difference between the second pressure signal 25 and the third pressure signal 26. This has the advantage that the multiplied signal 33 is generally unaffected or minimally affected by sudden increased in fan intake pressure, of the sort that would be expected during rapid aircraft manoeuvres.

The combustor pressure probe 9 measures the pressure of the gas in the combustor 8. A second pressure signal 35 is transmitted by the combustor pressure probe 9 to second processing means comprising second gate means 36. The second gate means 36 is in the form of a high wins gate.

The control means 10 further includes a fixed signal transmission means 37 to transmit a predetermined pressure signal 37A to the second gate means 36.

The predetermined pressure signal 37A is set to a fixed value, e.g. 10 psia, which is lower than the second pressure signal 35 during normal operation of the engine 1, and also lower than the second pressure signal 35 during a stall. However, the fixed pressure signal is higher than the combustor pressure during engine start or sub-idle operation or when it is unlit. This reduces the possibility of spurious stall detection.

The second gate means 36 transmits the processed second pressure signal 38 to the divider means 34 as described above. The signal transmitted by the second gate means 36 is the higher of the second pressure signal 35 and the fixed pressure signal 37A. In most situations, the signal transmitted by the second gate means 36 will be the second pressure signal 35. However, during engine start, or sub-idle operation of the engine or when the engine is unlit, the combustor pressure may be below 10 psia, in which case the processed second pressure signal 38 will be the fixed pressure signal 37A. The multiplied signal 33 provided by the multiplier means 32 is divided at the dividing means 34 by the processed second pressure signal 38 to provide a divided signal 39.

The divided signal 39 generally represents the multiplied signal 33 expressed as a percentage of the processed second pressure signal 38. For example, during a stall, the multiplied signal 33 could be, for example approximately 0.3 psia, and the combustor pressure, or the processed second pressure signal could be substantially 12 psia. In such a situation the divided signal 39 would be calculated by:

$$\frac{0.3}{12} \times 100 = 2.5\%$$

The divided signal 39 is received by a comparator arrangement in the form of a further comparator 40 and compared to a threshold signal 41 transmitted by threshold signal transmission means 42. The threshold signal 41 is also expressed as a percentage, and the threshold signal 41 is typically in the region of 1.2%. Where the divided signal 39 is greater than the threshold signal 41 i.e. during a stall, the output signal 44 provided by the further comparator 40 is a "true" signal or a signal of 1. During normal operation of the engine 1, the divided signal 39 is less than the threshold signal 41 and the output signal 44 provided by the further comparator 40 is a "false" signal or a signal of 0.

The output signal 44 is transmitted to a fault integrator 46. The fault integrator 46 is programmed to step up by a value of 0.2 each time it receives an output signal 44 which has a value of 1.

In addition, the fault integrator 46 is programmed to step down by a value of 0.2 each time it receives an output signal 44 which has a value of 0.

When the fault integrator 46 has received sufficient output signals 44 to have stepped up by a value of 1, the fault integrator transmits a stall detection signal 48, which may be a signal having a value of 1.

In the embodiment shown, the surge detection means 50 receives a combustor pressure probe 9, indicating the pressure in the combustor 7. If the combustor pressure signal 52 can be the same as the second pressure signal 35.

The details of surge detection are well known and are not described herein. If the combustor pressure signal 52 indicates a surge, the surge detection means 50 provides a surge detection signal 54 to delay means 56.

The delay measuring 56 imparts a delay of substantially 0.5 s to the surge detection signal 54 and transmits therefrom a delayed surge detection signal 154.

The delayed surge detection signal 154 and the stall detection signal 48 are transmitted to stall recovery means 58. If the stall recovery means 58 is still receiving a stall detection signal 48 when the delayed surge detection signal 154 is received thereby, the stall recovery means 58 commences stall recovery action by providing a stall recovery signal or signals 60.

The stall recovery signal or signals 60 can be transmitted to, for example, the fuel system to momentarily interrupt the fuel supply fed to the injectors 11. The stall recovery signals 11 can also be transmitted to the igniters 9 to ignite the fuel after the momentary interruption.

There is thus described a system for detection of a stall in a gas turbine engine and for recovery therefrom. The system has the advantage of only taking action to recover from the stall in the event that natural recovery will not occur. The preferred embodiment provides a direct indication of the presence of stall by utilising the fluid mechanical processes intrinsic to the stall itself, which provide an indication of the presence of stall. This is an advantage over prior art processes which rely on commonly observed side effects from stalls, which may either not be present or may be caused by other phenomena. Moreover, the system utilises pressure measurement at the fan intake duct which has the advantage of being essentially pseudo-steady during normal engine operation.

Various modifications can be made without departing from the scope of the invention. For example, the system could be applied to engine pressure, other than the pressure at the fan intake duct if account is taken of the variation of these pressures during normal engine operation.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A stall detection and recovery system for a gas turbine engine, the system comprising surge detection means for detecting an engine surge and proving a surge detection signal for indicating said engine surge, stall detection means to provide a stall detection signal relating to a condition of gas flowing through the engine, and stall recovery means to receive said surge detection signal and said stall detection signal, said stall recovery means being arranged to control combustor operating means whereby when the stall detection signal indicates an engine stall, the stall recovery means controls the combustor operating means to effect recovery from the stall.

2. A system according to claim 1 wherein the combustor operating means comprises means to supply fuel to the combustor, and an ignitor for igniting the fuel.

3. A system according to claim 1 wherein the stall recovery means operates to interrupt momentarily said supply of fuel and to ignite the fuel supplied to the engine after said momentary interruption.

4. A system according to claim 1 wherein the condition of the gas to which the stall detection signal relates is the pressure of the gas.

5. A system according to claim 1 including delay means to impart a delay of a predetermined time to the surge detection signal, whereby the stall recovery means operates to effect recovery from the stall a predetermined time after the surge detection signal indicates an engine surge providing the stall detection signal still indicates an engine stall.

6. A system according to claim 5 wherein the predetermined time is in the region of 0 to 10 seconds.

7. A system according to claim 6 wherein the predetermined time is in the region of 0.1 to 10 seconds.

8. A system according to claim 7 wherein the predetermined time is in the region of 0.1 to 1 second.

9. A system according to claim 8 wherein the predetermined time is substantially 0.5 seconds.

10. A system according to claim 5 wherein the surge detection means provides a surge signal, indicative of a surge having been detected, and the surge signal is received by the delay means which imparts said delay to the surge signal.

11. A system according to claim 10 wherein the surge detection means comprises combustor monitoring means to monitor a condition of the gas in the combustor.

12. A system according to claim 11 wherein the combustor monitoring means monitors combustor pressure.

13. A system according to claim 1 wherein the stall detection means comprises a pressure monitoring arrangement for monitoring the pressure of the gas at a region of the engine and providing a pressure signal.

14. A system according to claim 13 wherein the stall detection signal and the surge detection signal are transmitted through the stall recovery means for controlling the supply of fuel and the ignitor as aforesaid.

15. A stall detection and recovery method for a gas turbine engine, the method comprising detecting an engine surge and proving a surge detection signal for indicating said engine surge, detecting an engine stall and providing a stall detection signal relating to a condition of gas flowing through the engine, and providing a stall recovery means to receive said surge detection signal and said stall detection signal, said stall recovery means being arranged to control combustor operating means whereby when the stall detection signal indicates an engine stall, the stall recovery means controls the combustor operating means to effect recovery from the stall.

16. A method according to claim 15 wherein the combustor operating means comprises means to supply fuel to the combustor, and an ignitor for igniting the fuel.

17. A method according to claim 15 wherein the recovery from stall comprises interrupting momentarily said supply of fuel and to ignite the fuel supplied to the engine after said momentary interruption.

18. A method according to claim 15 wherein the condition of the gas to which the second signal relates is pressure of gas.

19. A method according to claim 15 wherein a delay of a predetermined time is imparted to the surge detection signal, whereby the stall recovery means operates to effect recovery from the stall said predetermined time after the surge detection signal indicates an engine surge providing the stall detection signal still indicates an engine stall.

20. A method according to claim 19 wherein the predetermined time is in the region of 0 to 10 seconds.

21. A method according to claim 20 wherein the predetermined time is in the region of 0.1 to 10 seconds.

22. A method according to claim 21 wherein the predetermined time is in the region of 0.1 to 1 second.

23. A method according to claim 22 wherein the predetermined time is substantially 0.5 seconds.

24. A method according to claim 19 wherein a surge signal is provided, indicative of a surge having been detected, said delay is imparted to the surge signal.

25. A method according to claim 15 including monitoring the pressure of the gas at a region of the engine and providing a pressure signal.

26. A method according to claim 25 comprising providing combustor monitoring means to monitor a condition of the gas in the combustor.

27. A method according to claim 26 wherein the combustor monitoring means monitors combustor pressure.

28. A method according to claim 27 wherein the stall detection signal and the surge detection signal are transmitted through the control means for controlling the supply of fuel and the ignitor as aforesaid.

29. A gas turbine engine incorporating a system according to claim 1.

* * * * *